Aug. 5, 1924.
P. M. McHUGH
1,503,657
PROCESS OF MANUFACTURING SUGAR
Filed April 26, 1920    2 Sheets-Sheet 1
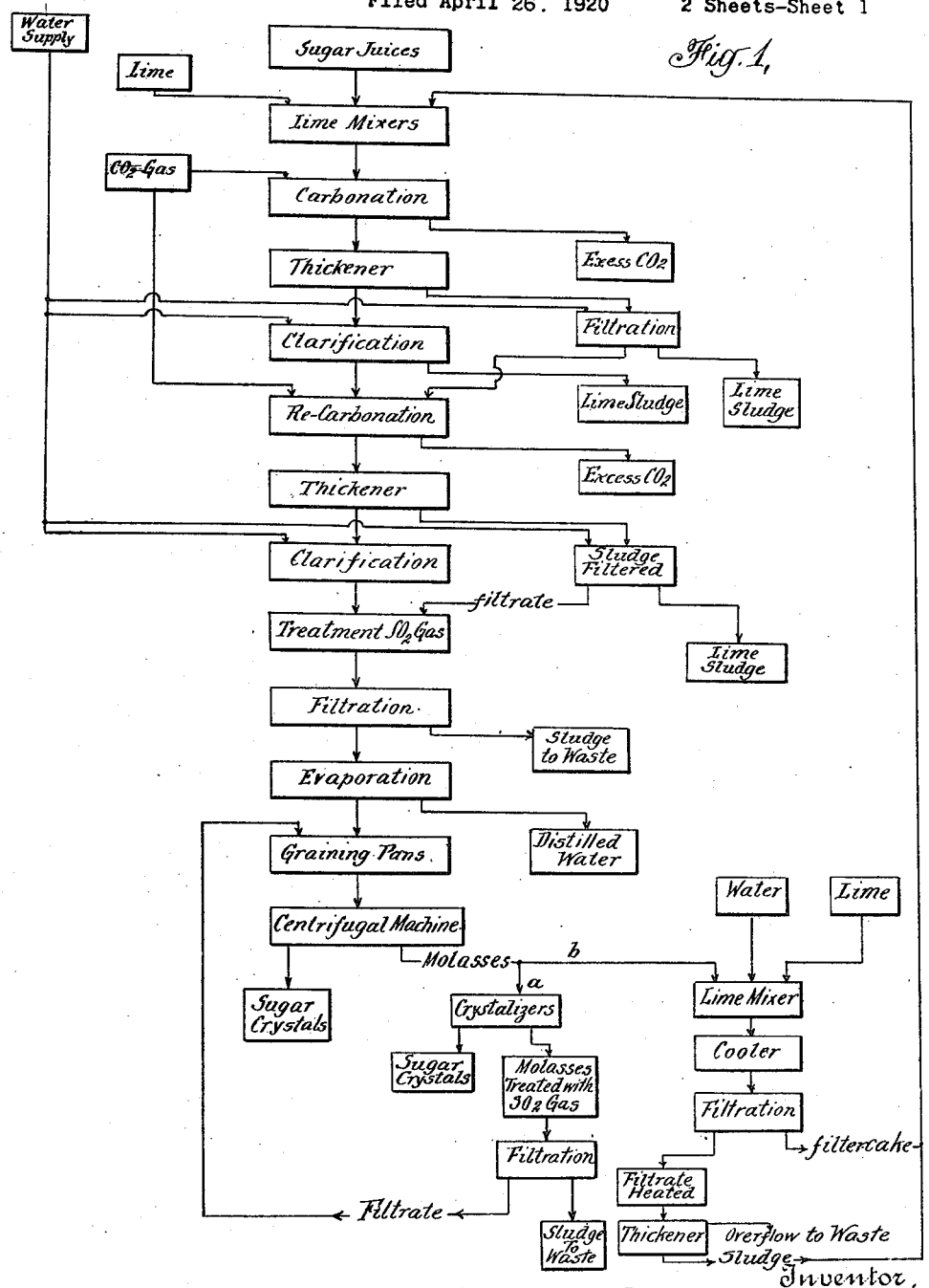
Fig. 1, Aug. 5, 1924.                                                              1,503,657
P. M. McHUGH
PROCESS OF MANUFACTURING SUGAR
Filed April 26, 1920          2 Sheets-Sheet 2
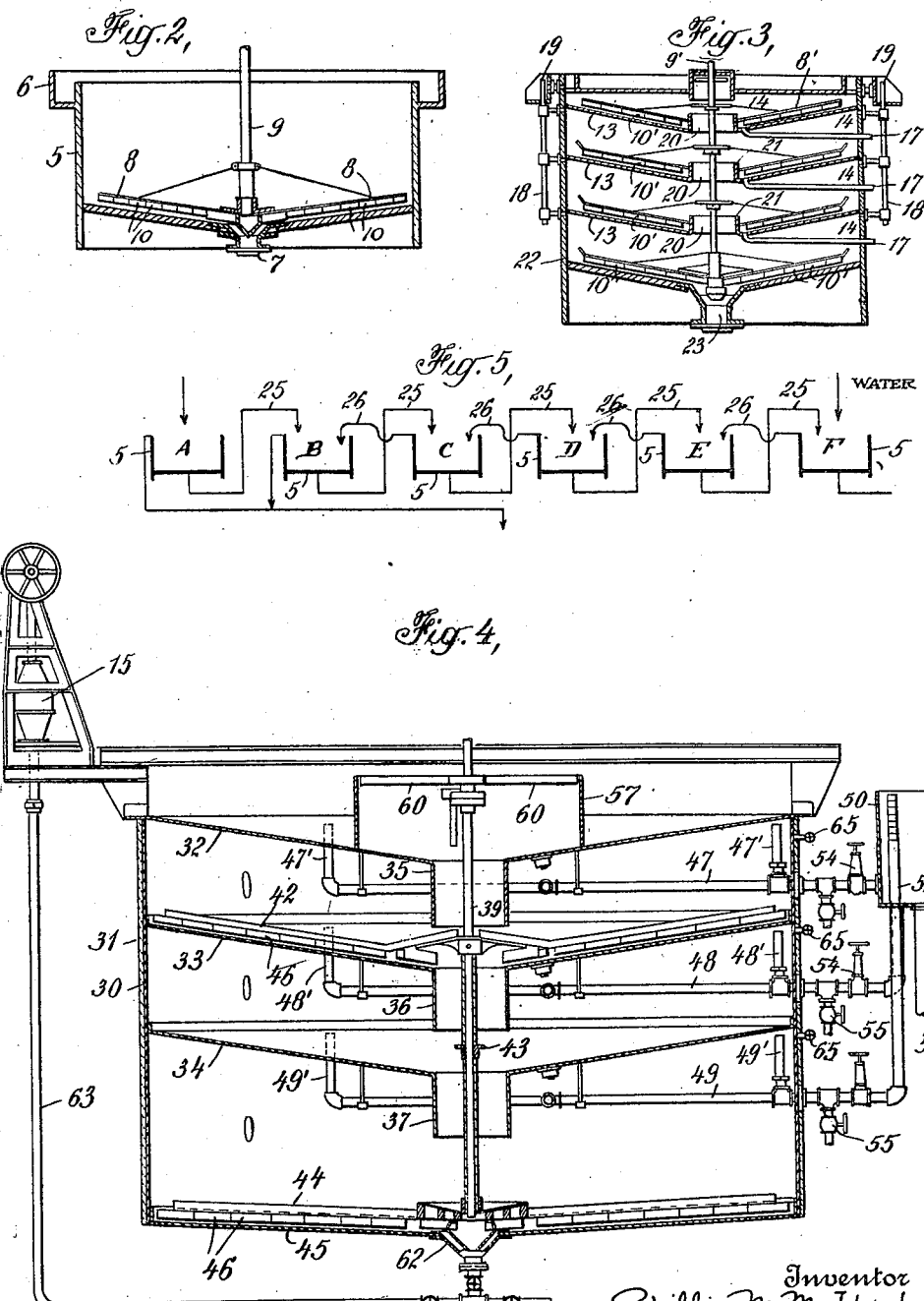

Patented Aug. 5, 1924.

1,503,657

UNITED STATES PATENT OFFICE.

PHILLIP M. McHUGH, OF DENVER, COLORADO, ASSIGNOR TO THE DORR COMPANY, A CORPORATION OF DELAWARE.

PROCESS OF MANUFACTURING SUGAR.

Application filed April 26, 1920. Serial No. 376,477.

*To all whom it may concern:*

Be it known that I, PHILLIP M. McHUGH, a citizen of the United States, residing at Denver, in the county of Denver, State of Colorado, have invented certain new and useful Improvements in Processes of Manufacturing Sugar; and I do hereby declare the following to be a full, clear, and exact description of the invention, such as will enable others skilled in the art to which it appertains to make and use the same.

This invention relates to improvements in sugar manufacture, and has for its object the provision of certain improvements in sugar manufacture and more particularly the provision of an improved method of separating sludge and solid materials from sugar juices, sugar waters, and the like.

In the customary commercial processes for the manufacture of both cane and beet sugars, it is necessary in some stage or other of the process to separate the sugar juices or water from accompanying sludge and solid material. Various methods and apparatus for effecting this separation are in use, but, as far as I am aware, all of these heretofore customary separating procedures are more or less objectionable on one account or another. The present invention contemplates an improved method of separating solid material from sugar juices and the like in a continuous manner, and is particularly characterized by its simplicity, the short time required to effect the desired separation and by the conservation of heat during the separating period.

The prepartion of sugar from sugar cane as well as from sugar beets involves generally four principal operations, (1) extraction of the juice, (2) clarification, (3) evaporation, and (4) separation of the crystals.

In the preparation of raw sugar from sugar cane, the cane is stripped of its leaves in the field and taken to the mills where it is crushed and as much as possible of the juice is expressed. As the result of this extracting operation, there is produced a cane sugar juice and a solid residue, known in the industry as "bagasse," which is generally used for fuel. The juice is now treated with a quantity of milk of lime sufficient to neutralize the free acidity of the juice and to combine with the albumin and part of the gummy matter. The juice is now ready for defecation or clarification which is ordinarily carried out in two steps. In the first step the limed juice is pumped through tubular heaters and brought to 212° F. (or above this point in the so-called "superheat process"). The action of the heat coagulates the albumin and prepares the suspended and coagulated solids for subsequent removal.

In the preparation of sugar from beets, the beets are washed and cut into slices. The juice is extracted from the sliced beets by a diffusion or maceration process, and the resulting beet sugar juice is then mixed with milk of lime to neutralize the organic acids and to coagulate the albumin and mucus. An excess of lime is ordinarily employed so that the step of defecation in the beet sugar industry is followed by carbonation, in the course of which any excess of lime is removed by forcing carbon dioxide gas into the juice. In the course of the defecating and carbonation operations the coagulated solid material is removed from the juice, at some stage or other, to produce a clear neutralized beet sugar juice which is ready for the subsequent operations of evaporation, graining and centrifuging.

Various procedures and instrumentalities have been employed in the second step of the clarifying operation. For example, the heated juice is frequently discharged into open settling tanks for quiescent settling. After a period of time three layers form, namely, (1) scum, (2) clear liquor, and (3) mud. This process of operation requires a relatively long time and results in consequent inefficiencies. First, a large number of tanks are necessary, involving high labor cost, and requiring excessive floor space; second, radiation losses are high; third, the slow precipitation results in a sludge of low density containing a large percentage of sugar juices which must be subsequently removed; and, fourth, the juices remain in contact with the sludge too long, resulting in fermentation losses.

The object of the present invention is to overcome or minimize these difficulties. This is accomplished by continuously removing both scum and sludge from the settling tank. By employing slowly revolving scraper arms which pass over the bottom of the tank, the sludge settles more quickly, is denser, and is constantly, positively and quickly removed from contact with the juices The capacity of such a tank, which may be built with a plurality of settling trays, is so much greater than the ordinary tank built for quiescent settling, that the number of tanks for a given capacity is greatly reduced, which means lowered labor costs, less floor space occupied, and smaller radiation losses. The denser sludge means less sugar carried away to the filters and the possibility of efficient use of rotary vacuum filters, and the rapid removal of the sludge greatly cuts down fermentation losses.

Continuous settling is not in itself new, but without the use of constantly revolving scraper arms, it is impossible to effect the savings discussed above.

The present invention, although involving an improved method of separating solid material from sugar juice, which may be employed at any stage of the sugar manufacturing process, where it is desired to carry out a separation of this character, is nevertheless particularly adapted to defecation, and especially beet sugar defecation, where carbonation has been employed, because of the great bulk of precipitate following carbonation and the consequent difficulty of removing it expeditiously. The method will be specifically described in connection with beet sugar manufacture, but it will be understood that it is not necessarily so limited.

The novel features of the invention which I believe to be patentable are definitely set forth in the appended claims. These features, together with the principles of operation of methods and apparatus embodying the same, will be understood from the following description, taken in conjunction with the accompanying drawings, in which:

Fig. 1 is a diagrammatic flow sheet of an arrangement of apparatus for the manufacture of beet sugar in which a separation of solid material from sugar juices is carried out in accordance with the principles of the invention;

Fig. 2 is a sectional elevation of a gravitational separator or thickener adapted for the practice of the invention;

Fig. 3 is a sectional elevation of a modified construction of separator adapted for the practice of the invention;

Fig. 4 is a still further modified form of separator which has been found particularly suitable for the purposes of the invention; and Fig. 5 is a diagrammatic view illustrating a plurality of separators arranged in series to operate on the countercurrent decantation principle The flow sheet of Fig. 1 illustrates diagrammatically a typical process for manufacturing sugar from sugar beets. The flow sheet is to a large extent self-explanatory, and I shall accordingly describe only those steps in the complete process of sugar manufacture which are particularly concerned with the improvements of the present invention.

The raw beet sugar juices are treated with lime in the usual manner to neutralize the organic acids and to coagulate the albumin, mucus and similar substances. An excess of lime is ordinarily used in the defecating or liming treatment, and this excess of lime is removed by carbonation. The conditions of temperature and pressure during the carbonation treatment are important factors if the resulting precipitate is to have the most satisfactory physical form for the subsequent removal thereof from the sugar liquor in accordance with the principle of the present invention. Thus, it has been found that the material should be maintained at a temperature just slightly below its boiling point during the carbonation treatment. For example, at the altitude of Denver, Colorado, it has been found that the temperature of the material during the carbonation treatment should be maintained above 90° C., but at the same time it is not the intention that the temperature should be as high as the boiling point of the liquor. The appropriate temperature of the material during the carbonation treatment may be obtained in any appropriate manner, such, for example, as by steam-heating coils which may be placed in the lime mixers or in the carbonation apparatus. The carbon dioxide gas should also preferably be heated to the appropriate temperature for carbonation hereinbefore mentioned. It is also preferred to heat the lime or equivalent liming agent to this temperature before its introduction into the lime mixers.

In accordance with the present invention, the precipitate resulting from the carbonation treatment is separated from the sugar juice in a gravitational separator, preferably of the Dorr thickener type. Thus, in accordance with the invention, a stratum of mixed sugar juice and solid material, resulting from the carbonation treatment, is subjected to a combined sedimentation and decantation treatment in the course of which substantially clear liquor is continuously withdrawn from the upper portion of the stratum and solid material settling on the bottom of the stratum is continuously worked towards an appropriate solids discharge outlet and withdrawn from the stratum It is customary to subject the sugar juice to a second carbonation treatment, and the material resulting from this second carbonation treatment is, in accordance with the present invention, subjected to a combined sedimentation and decantation treatment in a gravitational separator from which substantially clear liquid is continuously decanted and the settled solids are mechanically worked towards an appropriate solids dischage outlet. In the flow sheet of Fig. 1, this separation of solid material from the sugar juices after both the first and second carbonation, in accordance with the principles of the present invention, has been designated by the legend "thickener".

The substantially clear overflow from the second thickener treatment is subjected to appropriate treatment, as indicated in the flow sheet, for the production of sugar crystals and molasses. The molasses is alternately treated by two different processes indicated on the flow sheet by reference numerals a and b. Thus, the molasses is treated by the method a for an appropriate period of time, and then by the method b for an appropriate period of time. In accordance with method a it will be observed that a final filtrate is obtained which is returned to the graining pans.

In the treatment of the molasses in accordance with the method designated b on the flow sheet of Fig. 1, the molasses is diluted with water in about the proportion of one part of molasses and ten parts of water. This mixture is then treated with lime. The limed mixture is now agitated in appropriate coolers maintained at a temperature of about 12° C. As a result of this treatment, a precipitate of calcium tri-saccharate is obtained, and removed from the liquor by filtration in vacuum filters or filter presses. The sludge or filter cake is returned to the original liming treatment of the raw sugar juices. The filtrate contains in solution calcium mono- and bi-saccharate and varying amounts of potash and is next heated to about 85° C. to convert the mono- and bi-saccharate into tri-saccharate. From the heaters the material is introduced into gravitational separators or thickeners of the type hereinbefore described and the resulting sludge composed largely of tri-saccharate is conducted back to the original liming operation, while the overflow liquor is run to waste.

A gravitational separator or thickener of the Dorr type suitable for the purposes of the invention is illustrated in Fig. 2 of the accompanying drawings. This separator consists generally of a cylindrical and relatively shallow tank 5 provided at its upper edge with a peripheral overflow launder 6 and having in its bottom a centrally disposed outlet 7 for the discharge of settled solids. A revolving sludge collecting mechanism is operatively mounted within the tank 5 and comprises a vertically disposed shaft 9 rotatably mounted in appropriate overhead bearings, and provided with radially disposed arms 8 carrying a series of plows or scrapers 10 which are arranged to revolve in proximity to the bottom of the tank to move settled solid material from the periphery of the settling tank towards the central solids discharge outlet.

A tray separator or thickener adapted to contain a plurality of superposed strata of mixed juice and solids is especially well adapted for the purposes of the invention. A separator of this type is illustrated in Fig. 3 of the drawings and comprises a cylindrical tank 22 which, by a plurality of superposed decks or partitions 13, is divided into a number of settling compartments 14. The mixed sugar juice and solids is fed into the top compartment and is distributed to the lower compartments through central openings 20 in the partitions 13. The openings 20 may be surrounded by upstanding collars 21 for the retention of the solids on the shelves or partitions 13.

A revolving sludge collecting mechanism is operatively mounted within the tank 22 and comprises a vertically disposed shaft 9', carrying a plurality of sets of radially disposed arms 8' arranged to revolve in proximity to the upper surface of the partitions 13 and the bottom of the tank. Each of the arms 8' carries a series of plows or scrapers 10' arranged to move settled solid material towards the center of the partitions 13 from whence the solids are discharged through pipes 17, as well as through the outlet 23 in the bottom of the tank. The substantially clear supernatant liquor is decanted from each stratum by rising in headers 18 to a point of overflow 19 above the upper deck or partition.

Tray separators or thickeners of a type similar to that illustrated in Fig. 3 but operating somewhat differently may be employed with advantage in carrying out the process of the invention. For example, the collars 21 and the discharge pipes 17 of the thickener illustrated in Fig. 3 may be eliminated, in which case the thickened product is removed from the upper decks through their central openings and the coagulated solids from all of the superposed strata or settling chambers collect in the lower stratum or compartment and are discharged therefrom in any appropriate manner.

A tray thickener of the type referred to in the preceding paragraph is illustrated in Fig. 4 of the accompanying drawings. This separator or thickener comprises a cylindrical tank 30 preferably having its sides or other exposed parts covered with a layer of heat insulating material 31. The interior of the tank is divided into a series of superimposed chambers or compartments by means of transverse partitions or trays 32, 33 and 34. These trays are secured at their outer periphery to the side wall of the tank 30 and at their centers have an opening from which depend boots 35, 36 and 37, respectively.

The trays are preferably inclined and slope from the periphery towards the opening at the center thereof. The depending boots 35, 36 and 37 are in alignment and form in effect a solids discharge path common to the three settling chambers within the tank.

A revolving sludge collecting mechanism is operatively mounted within the tank. This mechanism comprises a vertically disposed shaft 39 rotatably carried in appropriate overhead bearings secured to the superstructure, which, for the sake of simplicity, has been omitted from the drawings. The shaft 39 extends downwardly through the boots 35, 36 and 37. Three pairs of radially disposed arms 42, 43 and 44 are appropriately secured to the shaft 39 and are arranged to revolve in proximity to the upper surface of the trays 33 and 34 and the inclined bottom 45 of the tank, respectively. Each of the radially disposed arms carries a series of plows or scrapers 46 which are arranged to move settled solid material from the periphery of the settling chambers towards the central solids discharge outlet.

Clear liquor is withdrawn from the upper part of each of the three settling chambers of the separator by means of decanting pipes 47, 48 and 49. The decanting pipes extend through the side wall of the tank and within the tank are substantially Y-shaped and have vertically positioned decanting connections 47', 48' and 49', respectively. The upper open ends of the decanting connections 47', 48' and 49' are near the top of their respective settling chambers. These decanting connections are, moreover, arranged near the outer circumference of the settling chambers. The decanting connections are equally spaced about the outer circumferential portion of the settling chambers, and while three decanting connections are shown for each chamber, more may be employed if desired.

The solids which are collected on the trays by the plows 46 pass through the boots in a downwardly moving stream, which follows as nearly as may be the inner walls of the boots. As all of the liquid which is eventually withdrawn from the upper part of each settling chamber must enter it through the space between the lower end of the boot depending in that chamber, and the bottom of the chamber, it is evident that it must pass through the downwardly moving stream of solids from the chamber above. This results in an internal filtration which assists in clarifying the juices.

The decanting pipes 47, 48 and 49 are arranged to discharge into a sump 50. The decanting pipe 47 communicates directly with this sump near the bottom thereof, while the decanting pipes 48 and 49 communicate with the sump through vertical standpipes 52. The upper or outlet ends of the standpipes 52 are adjustable, and by varying the height of these standpipes the rate of flow of material through the separator can be appropriately adjusted to a certain extent. Outside the tank, the recanting pipes are provided with shut-off cocks 54 and separate outlet cocks 55. The sump 50 has a discharge pipe 56. Valved air ports 65 are associated with the tank 30 near the top of each of the settling chambers to permit the escape of air when initially filling the separator.

The tray 32 forms in effect the top of the separator. A cylindrical drum 57, considerably smaller in diameter than the tank 30, is secured above the tray 32 and provides a loading well into which the mixture of sugar juice and solid material is fed through an appropriately positioned inlet pipe. A pair of skimming arms 60 are secured to the shaft 39 near the top of the drum 57.

The bottom 45 of the tank is inclined although its inclination is somewhat less than that of the superposed trays. At its center, the bottom has a discharge cone 62 communicating with a solids discharge pipe 63.

From the foregoing description, it will be observed that the present invention involves an improvement in the process of manufacturing sugar as commonly practiced by which there is effected a decided reduction in, and in some cases the entire elimination of, the laborious and expensive method of separating by filtration the solid material from sugar juices, waters and the like. The use of gravitational separators or thickeners of the type herein described in sugar manufacture simplifies the manufacturing process, reduces the cost of operation and lessens the amount of labor and attention usually required in the operation of filter presses.

Where the separation of the substantially clear sugar liquor from the precipitate, following each carbonation stage of the process, is effected by sedimentation and decantation alone and without washing, as hereinbefore described, filtration of the thickened product is usually desirable in order to recover the small percentage of liquor contained therein. Prior to the present invention, it has been the general practice in the sugar manufacturing industry to employ filters of the pressure type, such as filter presses, for filtering sugar liquors. One of the special advantages of separating solid matter from sugar liquors by sedimentation and decantation in a gravitational separator, in accordance with the principles of the present invention, is that it permits the use of a simpler and more economical type of filter for the filtration of the thickened product than is required to separate solid material from sugar juices in accordance with the heretofore prevailing practices. Thus, I have found that the thickened product from the gravitational separators or thickeners may by very advantageously filtered in a filter of the vacuum type. In general, such a vacuum filter comprises a rotating drum having a cylindrical filtering medium which is partly submerged in the liquor to be filtered. A reduced pressure or vacuum is maintained on the inner side of the filtering medium, as the result of which clear liquor is drawn through the filtering drum, leaving on the outer surface of the drum a cake or layer of solid material which is appropriately dried and removed from the filtering medium while the latter is rotating through that portion of its path outside of the liquor to be screened. It is, therefore, my preferred practice to subject the thickened product discharged from the gravitational separators or thickeners to filtration in a vacuum filter, preferably, of the rotating drum type. This combination of gravitational separator or thickener and vacuum filter is a particularly important and advantageous one, since both the gravitational separator and vacuum filter are apparatus of the continuous type, and by their conjoint use the separation of solid matter from sugar juices and liquors can be made a continuous one.

If desired, a vacuum filter may be employed in conjuction with the gravitational separator or separators after each carbonation stage, but in some instances I find it advantageous to combine the thickened product of the gravitational separators of two carbonation stages, for example, the first and second carbonation treatments, and to filter this combined product by a single filter of the vacuum type.

By the combination of gravitational separator and vacuum filter hereinbefore described, I find that a sugar liquor of higher purity is obtained than in the heretofore customary practices using filter presses. By higher purity, I mean that the sugar liquor obtained by the practice of the present invention, as hereinbefore particularly described, contains a lower percentage of impurities, such, for example, as lime salts, albuminous and pectin compounds, than is contained in the sugar liquors obtained by the heretofore customary procedures.

Rotary vacuum filters have not heretofore been generally used in the carbonation step of sugar manufacture, since the use of this type of filter with relatively dilute liquors is not entirely satisfactory from an economical standpoint. It is, accordingly, only in combination with a gravitational separator of the type herein specified that a rotary vacuum filter finds special utility in the carbonation step of sugar manufacture. In accordance with the present invention, the vacuum filter is called upon to handle a thickened liquor containing a relatively high percentage of solids, and for this service the rotary vacuum filter is admirably adapted. This substitution of a rotary vacuum filter, for the customary filter presses heretofore generally employed in the sugar industry, enables continuous operation, results in a decreased labor cost and a reduction in the amount of required floor space for the filtering apparatus. For these reasons, it will be evident that the combined steps of continuous sedimentation and decantation followed by continuous vacuum filter, as contemplated by the present invention, are of especial advantage in sugar manufacture, and result in better continuity of service as well as decreased cost of operation.

A plurality of gravitational separators may, if desired, be arranged to operate on the countercurrent decantation principle. When using such an arrangement of apparatus, no subsequent filtration of the sludge discharged from the end of the series of thickeners is necessary. The sugar juices overflowing at the opposite end of the series of thickeners are in many cases of sufficient purity and clarity for the next step of the process without further clarification. An arrangement of gravitational separators or thickeners operating on the countercurrent decantation principle is illustrated in Fig. 5 of the accompanying drawings. Six thickeners, A, B, C, D, E and F are diagrammatically represented in this figure. The thickened sludge from each thickener is delivered into the next succeeding thickener in the series, as indicated by the lines 25, and the overflowing liquid, beginning with the last thickener of the series, is fed into the preceding thickener in the series, as indicated by the lines 26. The sludge discharged from the last thickener F of the series is substantially free from sugar juices and may go to waste and the substantially clear liquor decanted from the first one or two thickeners of the series may be subjected to appropriate subsequent treatment.

The improved method of the invention for separating solids from sugar juices is a continuous operation from which two products result. One a thickened slime or sludge and the other a clear sugar juice. The separation is carried out rapidly, thereby preventing deterioration of the sugar juice and consequent loss of sugar, and is attended with high heat economy, particularly when the separators are protected by a heat insulating covering as hereinbefore described.

The gravitational separator or thickener hereinbefore described and illustrated in the accompanying drawings, whether of the single compartment or tray type, provides in operation a stratum of substantially uniform depth of mixed juice and solids. By this, I mean that the depth of mixed juice and solids in the separator, or in any stratum or compartment of the tray thickener, is substantially uniform throughout. As the result of combined sedimentation and decantation, a substantially clear liquor is decanted from the separator, while the settled solids are mechanically moved by the action of the revolving sludge collecting mechanism towards an appropriate solids discharge outlet.

As applied to the beet sugar industry, it will be seen from the foregoing description that the sugar juices, obtained after the treatment of the sliced sugar beets in diffusion cells, are mixed with lime or other equivalent defecator in suitable mixing devices for the liberation of the sugar. The product of the mixers is fed into carbonation vats in which it is impregnated with carbon dioxide ($CO_2$) gas to break up the calcium saccharates into free sugar and calcium carbonate. The product of the carbonation action, after removal of the excess carbon dioxide gas, is fed into a gravitational separator or thickener in which the sugar juices rise to the top and are decanted off while the precipitate or sludge of solid material settles to the bottom of the separator and is worked towards the solids discharge outlet by the revolving sludge collecting mechanism.

The sludge discharged from the separator carries a certain percentage of moisture, and, if desired, this sludge may be filtered to extract the moisture, leaving behind a lime filter cake which is a waste product.

The clear sugar juices decanted from the separator may be clarified and recarbonated, if necessary, or they may be directly subjected to evaporation for the production of sugar crystals. Where the decanted sugar juices are subjected to a second carbonation, a second thickener or series of thickeners is employed to separate the sugar juices from the sludge or precipitate resulting from the second carbonation treatment. The sludge discharged from this second thickening apparatus may be filtered to recover any juices remaining therein, the resulting filter cake being ordinarily a waste product. Usually, two carbonation treatments are sufficient, but where the sugar juices are subjected to further carbonation, the precipitate may advantageously be separated from the sugar juices by gravitational separators or thickeners.

The flow of mixed sugar juice and solids through the separator or thickener is advantageously controlled by regulating the discharge of the settled solids. To this end, I preferably provide a pump or equivalent device for appropriately withdrawing the settled solids from the thickener. Thus, in Fig. 4 of the drawings, a diaphragm pump 15 is operatively connected to the solids discharge pipe 63 for this purpose. The pump 15 is of the uniform or constant displacement type, that is to say, at each stroke it removes a fixed predetermined volume of sludge or thickened product from the separator. The ultimate density of this thickened product will generally be such that the ratio of solids to liquid in the product will be of the approximate order of 1 to 1. By appropriate adjustment, the pump is operated in such a manner that the volume of thickened product of the ultimate density withdrawn from the separator in a given interval of time contains substantially the same average amount of solids as is contained in the volume of mixed solids and liquor supplied to the separator in the same time interval. When thus properly adjusted, the constant displacement pump acts in the nature of a regulator, thereby insuring the proper functioning of the gravitational separator as a sedimentation and decantation apparatus. The fermentable mud and solid material settling on the bottom of the superposed strata are continuously and positively moved to a central discharge opening, and the quantity of sludge or mud removed from the thickener in a given time is definitely controlled by means of the diaphragm pump or equivalent device.

I claim:

1. In a process of manufacturing sugar, the improvement in the separation of sugar juices from solid matter admixed therewith which comprises subjecting a mixture of sugar juice and solid matter in a stratum of substantially uniform depth to sedimentation and decantation in the course of which solid matter settles by gravity towards the bottom of the stratum and sugar juice is continuously decanted from near the top of the stratum, continuously feeding a mixture of sugar juice and solid matter to the stratum, continuously and mechanically moving the settled solid matter in proximity to the bottom of the stratum towards the center thereof, and continuously discharging solid matter from near the bottom of said stratum in the form of a thickened product of such density that the total amount of solid matter discharged in a given time interval is approximately the same average amount of solid matter fed to the stratum during the same time interval.

2. In a process of manufacturing sugar, the improvement in the separation of sugar juices from solid matter admixed therewith which comprises subjecting a mixture of sugar juice and solid matter in a stratum of substantially uniform depth to sedimentation and decantation in the course of which solid matter settles by gravity towards the bottom of the stratum and sugar juice is continuously decanted from near the top of the stratum, continuously feeding a mixture of sugar juice and solid matter to the stratum, continuously and mechanically moving the settled solid matter in proximity to the bottom of the stratum towards the center thereof, and continuously discharging solid matter from near the bottom of said stratum in the form of a thickened product containing about equal parts of solid matter and liquid.

3. In a process of manufacturing sugar, the improvement in the separation of sugar juices from solid matter admixed therewith which comprises subjecting a mixture of sugar juice and solid matter in a stratum of substantially uniform depth to sedimentation and decantation in the course of which solid matter settles by gravity towards the bottom of the stratum and sugar juice is continuously decanted from near the top of the stratum, continuously feeding a mixture of sugar juice and solid matter to the stratum, continuously and mechanically moving the settled solid matter in proximity to the bottom of the stratum towards the center thereof, continuously discharging solid matter from near the bottom of said stratum in the form of a thickened product, and subjecting the discharged thickened product to filtration in a filter of the reduced pressure type in the course of which there is continuously produced a filtrate and a suitably dehydrated filter-cake.

4. The process of separating solid impurities from sugar juices which comprises progressively subjecting the mixture of juice and solids to sedimentation in superposed strata, moving the settled solids to points of collection, discharging the collected solids in a downwardly moving stream, and decanting the clear juice from near the top of each stratum, the feed to a lower stratum passing through the downwardly moving stream of solids discharged from the stratum above.

In testimony whereof I affix my signature.

PHILLIP M. McHUGH.